US008253712B2

(12) United States Patent
Klinghult

(10) Patent No.: US 8,253,712 B2
(45) Date of Patent: Aug. 28, 2012

(54) METHODS OF OPERATING ELECTRONIC DEVICES INCLUDING TOUCH SENSITIVE INTERFACES USING FORCE/DEFLECTION SENSING AND RELATED DEVICES AND COMPUTER PROGRAM PRODUCTS

(75) Inventor: Gunnar Klinghult, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 614 days.

(21) Appl. No.: 12/434,220

(22) Filed: May 1, 2009

(65) Prior Publication Data

US 2010/0277431 A1    Nov. 4, 2010

(51) Int. Cl.
G06F 3/045    (2006.01)
(52) U.S. Cl. ........................................ 345/174; 345/173
(58) Field of Classification Search ........... 345/173–179
See application file for complete search history.

(56) References Cited

U.S. PATENT DOCUMENTS

| 7,465,914 | B2 * | 12/2008 | Eliasson et al. | 250/221 |
| 2002/0149571 | A1 * | 10/2002 | Roberts | 345/174 |
| 2003/0026971 | A1 * | 2/2003 | Inkster et al. | 428/304.4 |
| 2006/0098004 | A1 * | 5/2006 | Cok | 345/207 |
| 2007/0052690 | A1 * | 3/2007 | Roberts | 345/173 |
| 2007/0085837 | A1 * | 4/2007 | Ricks et al. | 345/173 |
| 2007/0119698 | A1 | 5/2007 | Day | |
| 2007/0229464 | A1 * | 10/2007 | Hotelling et al. | 345/173 |
| 2008/0055262 | A1 | 3/2008 | Wu et al. | |
| 2008/0129704 | A1 * | 6/2008 | Pryor | 345/173 |

(Continued)

FOREIGN PATENT DOCUMENTS

EP    1 691 263 A1    8/2006
(Continued)

OTHER PUBLICATIONS

Notification of Transmittal of the International Search Report and the Written Opinion of the International Searching Authority; International Search Report; Written Opinion of the International Searching Authority corresponding to International Application No. PCT/IB2009/054880; Date of mailing: Feb. 8, 2011; 11 pages.

(Continued)

Primary Examiner — Alexander Eisen
Assistant Examiner — Nelson Lam
(74) Attorney, Agent, or Firm — Myers Bigel Sibley & Sajovec, P.A.

(57) ABSTRACT

An electronic device may include a touch sensitive user interface and a contact detector configured to detect a location of contact on a surface of the touch sensitive user interface. A force detector may be configured to detect a force/deflection on/of the surface of the touch sensitive user interface using electromagnetic radiation. A controller may be coupled to the touch sensitive user interface. The controller may be configured to provide a first response to the contact on the surface of the touch sensitive user interface when the detected force/deflection is less than a threshold. The controller may be further configured to provide a second response to the contact on the surface of the touch sensitive user interface when the detected force/deflection is greater that the threshold with the first and second responses being different. Related methods are also discussed.

18 Claims, 6 Drawing Sheets

U.S. PATENT DOCUMENTS

| | | | |
|---|---|---|---|
| 2008/0152215 A1* | 6/2008 | Horie et al. | 382/154 |
| 2008/0259044 A1* | 10/2008 | Utsunomiya et al. | 345/173 |
| 2008/0273013 A1* | 11/2008 | Levine et al. | 345/173 |
| 2009/0015564 A1* | 1/2009 | Ye et al. | 345/173 |
| 2009/0058824 A1* | 3/2009 | Nissar et al. | 345/173 |
| 2009/0147191 A1* | 6/2009 | Nakajima et al. | 349/116 |
| 2009/0153438 A1* | 6/2009 | Miller et al. | 345/55 |
| 2009/0189866 A1* | 7/2009 | Haffenden et al. | 345/173 |
| 2009/0189878 A1* | 7/2009 | Goertz et al. | 345/175 |
| 2009/0231305 A1* | 9/2009 | Hotelling et al. | 345/174 |
| 2009/0237374 A1* | 9/2009 | Li et al. | 345/174 |
| 2009/0303192 A1* | 12/2009 | Ho | 345/173 |
| 2010/0156852 A1* | 6/2010 | Chu et al. | 345/176 |

FOREIGN PATENT DOCUMENTS

| | | |
|---|---|---|
| EP | 1 879 096 A2 | 1/2008 |
| EP | 2 003 537 A2 | 12/2008 |

OTHER PUBLICATIONS

"Core Senosor Platform," http://www.optoacoustics.com/article.php?id=7, printed Mar. 31, 2009.

"What is LCD?—a definition from Whatis.com," http://searchcio-midmarket.techtarget.com/sDefinition/0,,sid183_qci214075,00.html, printed Mar. 31, 2009.

* cited by examiner

METHODS OF OPERATING ELECTRONIC DEVICES INCLUDING TOUCH SENSITIVE INTERFACES USING FORCE/DEFLECTION SENSING AND RELATED DEVICES AND COMPUTER PROGRAM PRODUCTS

FIELD OF THE INVENTION

This invention relates to user interfaces for electronic devices, and more particularly to touch sensitive user interfaces for electronic devices.

BACKGROUND OF THE INVENTION

A touch sensitive user interface (also referred to as a touch sensitive panel), such as a touch sensitive screen or a touch sensitive pad, may be used to provide an interface(s) on an electronic device for a user to enter commands and/or data used in the operation of the device. Touch sensitive screens, for example, may be used in mobile radiotelephones, particularly cellular radiotelephones having integrated PDA (personal digital assistant) features and other phone operation related features. The touch sensitive screens are generally designed to operate and respond to a finger touch, a stylus touch, and/or finger/stylus movement on the touch screen surface. A touch sensitive screen may be used in addition to, in combination with, or in place of physical keys traditionally used in a cellular phone to carry out the phone functions and features. Touch sensitive pads may be provided below the spacebar of a keyboard of a computer (such as a laptop computer), and may be used to accept pointer and click inputs. In other words, a touch sensitive pad may be used to accept user input equivalent to input accepted by a computer mouse.

Touching a specific point on a touch sensitive screen may activate a virtual button, feature, or function found or shown at that location on the touch screen display. Typical phone features which may be operated by touching the touch screen display include entering a telephone number, for example, by touching virtual keys of a virtual keyboard shown on the display, making a call or ending a call, bringing up, adding to or editing and navigating through an address book, accepting inputs for internet browsing, and/or other phone functions such as text messaging, wireless connection to the global computer network, and/or other phone functions.

Commercial pressure to provide increased functionality is continuing to drive demand for even more versatile user interfaces.

SUMMARY

According to some embodiments of the present invention, an electronic device may include a touch sensitive user interface, a contact detector, a force/deflection detector, and a controller. The contact detector may be configured to detect a location of contact on a surface of the touch sensitive user interface, and the force/deflection detector may be configured to detect a force/deflection on/of the surface of the touch sensitive user interface using electromagnetic radiation. The controller may be coupled to the touch sensitive user interface. The controller may be configured to provide a first response to the contact on the surface of the touch sensitive user interface when the detected force/deflection is less than a threshold. The controller may also be configured to provide a second response to the contact on the surface of the touch sensitive user interface when the detected force/deflection is greater that the threshold, with the first and second responses being different.

The contact detector may be configured to detect a two dimensional location of contact on the surface of the touch sensitive user interface, and the force/deflection detector may be configured to detect the force/deflection using reflected electromagnetic radiation. Moreover, the force/deflection detector may be configured to detect the force/deflection by detecting a deflection of the touch sensitive user interface.

The force/deflection detector may include an electromagnetic radiation source (such as a light emitting diode or a laser diode) configured to transmit the electromagnetic radiation onto a portion of the touch sensitive user interface and an electromagnetic radiation detector (such as a photodiode or phototransistor) configured to detect portions of the electromagnetic radiation reflected from the touch sensitive user interface. The electromagnetic radiation source may be configured to modulate the electromagnetic radiation, and the electromagnetic radiation detector may be configured to selectively detect the modulated electromagnetic radiation. Moreover, the electromagnetic radiation source may be configured to transmit non-visible electromagnetic radiation, such as infrared (IR) radiation. In addition, the electromagnetic radiation source may be configured to transmit the electromagnetic radiation only after the contact detector has detected contact.

The touch sensitive user interface may include a liquid crystal display with a transparent substrate and a liquid crystal material adjacent the transparent substrate, and the electromagnetic radiation source may be configured to transmit the electromagnetic radiation through the liquid crystal material. The touch sensitive user interface may include a liquid crystal display with a transparent substrate and a liquid crystal material adjacent the transparent substrate in an active pixel region of the touch sensitive user interface, and the electromagnetic radiation source may be configured to transmit the electromagnetic radiation onto a portion of the touch sensitive user interface outside the active pixel region. The touch sensitive user interface may include a liquid crystal display with a transparent substrate and a liquid crystal material adjacent the transparent substrate in an active pixel region of the touch sensitive user interface, and the electromagnetic radiation source may include a light emitting device (such as a light emitting diode) on a surface of the transparent substrate adjacent the liquid crystal material. The touch sensitive user interface may include a liquid crystal display with a transparent substrate and a liquid crystal material adjacent the transparent substrate in an active pixel region of the touch sensitive user interface, and the electromagnetic radiation detector may include a photosensor (such as a photodiode or phototransistor) on a surface of the transparent substrate adjacent the liquid crystal display.

The contact detector may be configured to detect the location of contact using one of infrared (IR) contact sensing, acoustic wave contact sensing, capacitive contact sensing, and/or resistive contact sensing. The contact detector may be configured to detect a location of contact at a virtual button (such as an icon) provided on the touch sensitive user interface, the controller may be configured to provide the first response of selecting the virtual button (such as changing an appearance, size, color, brightness, etc.), and the controller may be configured to provide the second response of executing a function associated with the virtual button (such as running an application or program associated with the virtual button). The contact detector may be configured to detect a location of contact at a virtual button (such as a scroll button) provided on the touch sensitive user interface, the controller may be configured to provide the first response of executing a function associated with the virtual button at a first rate, and the controller may be configured to provide the second response by executing the function associated with the virtual button at a second rate different than the first rate.

According to other embodiments of the present invention, a method of operating an electronic device including a touch sensitive user interface may include detecting a (two dimensional) location of contact on a surface of the touch sensitive user interface. A force/deflection on/of the surface of the touch sensitive user interface may be detected using (reflected) electromagnetic radiation. When the detected force/deflection is less than a threshold, a first response to the contact on the surface of the touch sensitive user interface may be provided. When the detected force/deflection is greater than the threshold, a second response to the contact on the surface of the touch sensitive user interface may be provided, with the first and second responses being different.

Detecting a location of contact may include detecting a two dimensional location of contact on the surface of the touch sensitive user interface, and the force/deflection may be detected using reflected electromagnetic radiation. Detecting the force/deflection may include detecting a deflection of the touch sensitive user interface.

Detecting the force/deflection may include transmitting the electromagnetic radiation onto a portion of the touch sensitive user interface and detecting portions of the electromagnetic radiation reflected from the touch sensitive user interface. The electromagnetic radiation may include modulated electromagnetic radiation, and detecting may include selectively detecting the modulated electromagnetic radiation. In addition, the electromagnetic radiation may include non-visible electromagnetic radiation, such as infrared (IR) radiation. The touch sensitive user interface may include a liquid crystal display with a transparent substrate and a liquid crystal material adjacent the transparent substrate, and transmitting the electromagnetic radiation may include transmitting the electromagnetic radiation through the liquid crystal material.

The touch sensitive user interface may include a liquid crystal display with a transparent substrate and a liquid crystal material adjacent the transparent substrate in an active pixel region of the touch sensitive user interface, and transmitting the electromagnetic radiation may include transmitting the electromagnetic radiation onto a portion of the touch sensitive user interface outside the active pixel region. The touch sensitive user interface may include a liquid crystal display with a transparent substrate and a liquid crystal material adjacent the transparent substrate in an active pixel region of the touch sensitive user interface, and transmitting the electromagnetic radiation may include transmitting the electromagnetic radiation from a light emitting device (such as a light emitting diode or a laser diode) on a surface of the transparent substrate adjacent the liquid crystal material. The touch sensitive user interface may include a liquid crystal display with a transparent substrate and a liquid crystal material adjacent the transparent substrate in an active pixel region of the touch sensitive user interface, and detecting portions of the electromagnetic radiation reflected from the touch sensitive user interface may include detecting portions of the electromagnetic radiation using a photosensor (such as a photodiode or phototransistor) on a surface of the transparent substrate adjacent the liquid crystal display.

Transmitting the electromagnetic radiation may include transmitting the electromagnetic radiation only after detecting contact. Detecting the location of contact on the surface of the touch sensitive user interface may include detecting the location using one of infrared (IR) contact sensing, acoustic wave contact sensing, capacitive contact sensing, and/or resistive contact sensing. Detecting a location of contact on the surface of the touch sensitive user interface may include detecting a location of contact at a virtual button (such as an icon) provided on the touch sensitive user interface, providing the first response may include selecting the virtual button (such as changing an appearance, size, color, brightness, etc.), and providing the second response may include executing a function associated with the virtual button (such as running an application or program associated with the virtual button). Detecting a location of contact on the surface of the touch sensitive user interface may include detecting a location of contact at a virtual button (such as a scroll button) provided on the touch sensitive user interface, providing the first response may include executing a function associated with the virtual button at a first rate, and providing the second response may include executing the function associated with the virtual button at a second rate different than the first rate.

DETAILED DESCRIPTION

Figure 1:
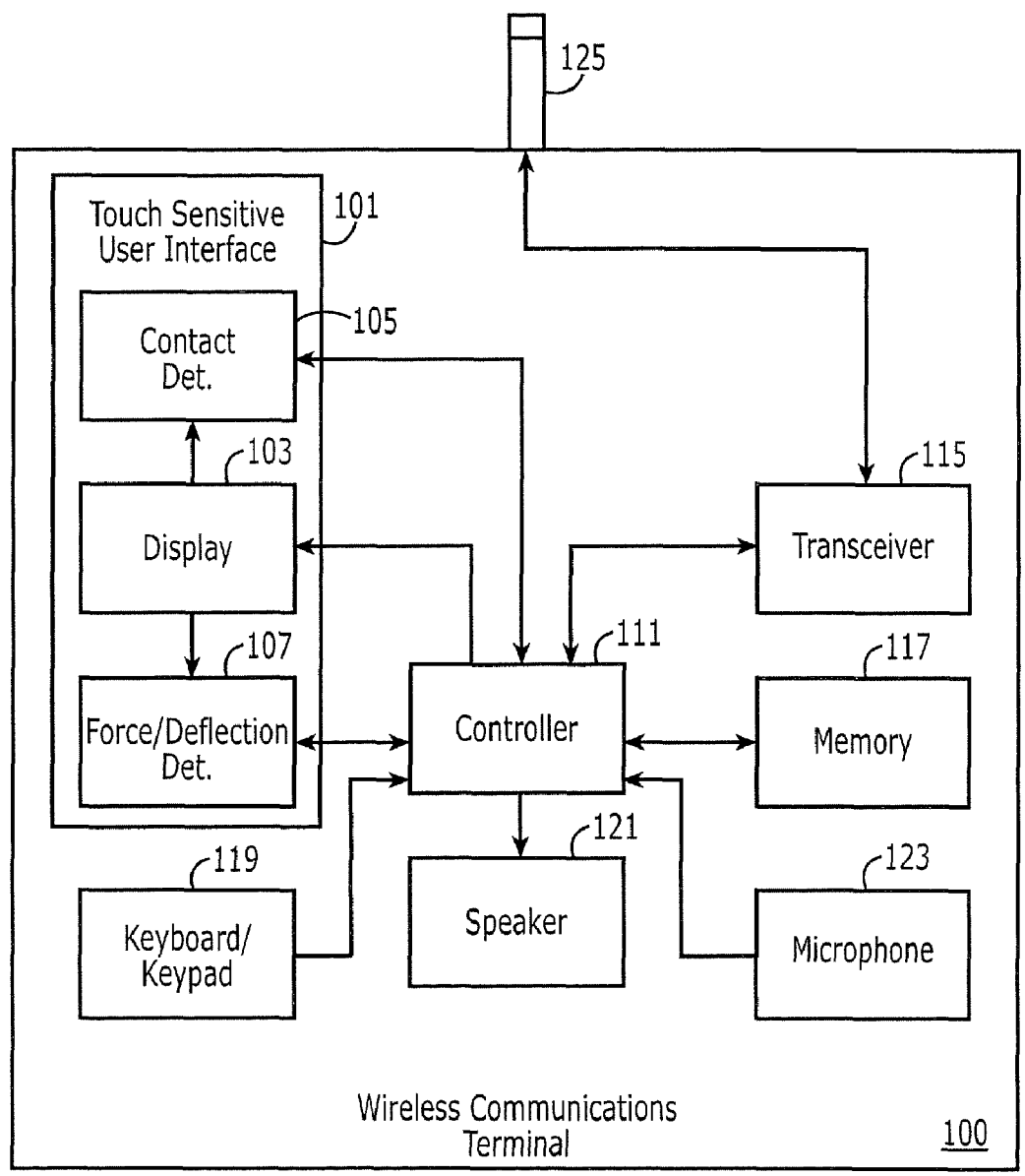
FIG. 1 is a block diagram illustrating an electronic device including a touch sensitive user interface according to some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, electronic devices, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain or store the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), and a compact disc read-only memory (CD-ROM).

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Although various embodiments of the present invention are described in the context of wireless communication terminals for purposes of illustration and explanation only, the present invention is not limited thereto. It is to be understood that the present invention can be more broadly used in any sort of electronic device to identify and respond to input on a touch sensitive user input.

It will be understood that, although the terms first, second, third etc. may be used herein to describe various elements, components, and/or sections, these elements, components, and/or sections should not be limited by these terms. These terms are only used to distinguish one element, component, or section from another element, component, or section. Thus, a first element, component, or section discussed below could be termed a second element, component, or section without departing from the teachings of the present invention.

FIG. 1 is a block diagram of an electronic device 100 including a touch sensitive user interface 101 according to some embodiments of the present invention. The electronic device 100, for example, may be a wireless communications device (such as a cellular radiotelephone), a PDA, an audio/picture/video player/recorder, a global positioning (GPS) unit, a gaming device, or any other electronic device including a touch sensitive screen display. Electronic device 100 may also include a controller 111 coupled to touch sensitive user interface 101, a radio transceiver 115 coupled to controller 111, and a memory 117 coupled to controller 111. In addition, a keyboard/keypad 119, a speaker 121, and/or a microphone 123 may be coupled to controller 111. As discussed herein, electronic device 100 may be a cellular radiotelephone configured to provide PDA functionality, data network connectivity (such as Internet browsing), and/or other data functionality.

The controller 111 may be configured to communicate through transceiver 115 and antenna 125 over a wireless air interface with one or more RF transceiver base stations and/or other wireless communication devices using one or more wireless communication protocols such as, for example, Global Standard for Mobile (GSM) communication, General Packet Radio Service (GPRS), enhanced data rates for GSM evolution (EDGE), Integrated Digital Enhancement Network (iDEN), code division multiple access (CDMA), wideband-CDMA, CDMA2000, Universal Mobile Telecommunications System (UMTS), WiMAX, and/or HIPERMAN, wireless local area network (e.g., 802.11), and/or Bluetooth. Controller 111 may be configured to carry out wireless communications functionality, such as conventional cellular phone functionality including, but not limited to, voice/video telephone calls and/or data messaging such as text/picture/video messaging.

The controller 111 may be further configured to provide various user applications which can include a music/picture/video recorder/player application, an e-mail/messaging application, a calendar/appointment application, and/or other user applications. The audio/picture/video recorder/player application can be configured to record and playback audio, digital pictures, and/or video that are captured by a sensor (e.g., microphone 123 and/or a camera) within electronic device 100, downloaded into electronic device 100 via radio transceiver 115 and controller 111, downloaded into electronic device 100 via a wired connection (e.g., via USB), and/or installed within electronic device 100 such as through a removable memory media. An e-mail/messaging application may be configured to allow a user to generate e-mail/messages (e.g., short messaging services messages and/or instant messages) for transmission via controller 111 and transceiver 115. A calendar/appointment application may provide a calendar and task schedule that can be viewed and edited by a user to schedule appointments and other tasks.

More particularly, touch sensitive user interface 101 may be a touch sensitive screen including a display 103 (e.g., a liquid crystal display, an organic light emitting diode display, etc.), a contact detector 105, and a force/deflection detector 107. For example, contact detector 105 may be configured to detect a two dimensional location of contact (e.g., contact from a finger and/or stylus) on a surface of display 103, and force/deflection detector 107 may be configured to detect a force/deflection at the two dimensional location of contact on the surface of display 103. More particularly, contact detector 105 may be configured to detect the two dimensional location (e.g., along an x-axis and a y-axis) of the contact on the surface of display 103 using infrared (IR) contact sensing, acoustic wave contact sensing, capacitive contact sensing, and/or resistive contact sensing. Contact and/or force/deflection sensing is/are discussed by way of example, in: U.S. patent application Ser. No. 12/386,462 entitled "Sensor, Display Including A Sensor, And Method For Using A Sensor" filed Feb. 10, 2009; U.S. patent application Ser. No. 12/356,858 entitled "Piezoresistive Force Sensor Integrated In A Display" filed Jan. 21, 2009; U.S. patent application Ser. No. 12/268,502 entitled "Methods Of Operating Electronic Devices Using Touch Sensitive Interfaces With Contact And Proximity Detection And Related Devices And Computer Program Products" filed Nov. 11, 2008; U.S. patent application Ser. No. 12/033,405 entitled "Identifying And Responding To Multiple Time-Overlapping Touches On A Touch Panel" filed Feb. 19, 2008; U.S. patent application Ser. No. 12/334,871 entitled "Touch Sensitive Displays With Coplanar Capacitive Touch And Proximity Sensor Pads And Related Touch Panels" filed Dec. 15, 2008; and U.S. patent application Ser. No. 12/334,818 entitled "Touch Sensitive Displays With Layers Of Sensor Plates Providing Capacitance Based Proximity Sensing And Related Touch Panels" filed Dec. 15, 2008. The disclosures of each of the above referenced patent applications is hereby incorporated herein in its entirety by reference.

Force/deflection detector 107 may be configured to detect the force/deflection by detecting a deflection (e.g., along a z-axis) of a portion of the touch sensitive user interface 101. The force/deflection detector 107 may detect, for example, a deflection of a protective screen provided on a liquid crystal display (LCD) of display 103, a deflection of a substrate(s) of a liquid crystal display (LCD) of display 103, and/or a deflection of a display module (e.g., including both substrates and liquid crystal material of an LCD) of display 103.

Force/deflection detector 107 may detect force/deflection using reflected electromagnetic radiation. For example, force/deflection detector 107 may include an electromagnetic radiation source (e.g., a light emitting diode (LED) and/or a laser diode) and an electromagnetic radiation detector (e.g., a photodiode and/or a phototransistor). More particularly, the electromagnetic radiation source may be configured to transmit the electromagnetic radiation onto a portion of the touch sensitive user interface (e.g., a protective screen, a substrate(s) of an LCD, and/or an entire display module including both substrates of an LCD), and the electromagnetic radiation detector may be configured to detect portions of the electromagnetic radiation reflected from the touch sensitive user interface. Use of reflected light to detect movement of a surface is discussed, for example, in the reference "Optoacoustics, Sound Solutions From Light Technology," Copyright 2009, Optoacoustics Ltd. (at world wide web address optoacoustics.com/article.php?id=7), the disclosure of which is hereby incorporated herein in its entirety by reference. Accordingly, contact detector 105 may be configured to detect a location of contact using a first sensing technology, and force/deflection detector 107 may be configured to detect deflection using a second sensing technology different than the first sensing technology. More particularly, force/deflection detector 107 may be configured to detect force/deflection (e.g., by measuring deflection using reflected electromagnetic radiation) while the contact detector 105 is detecting a location of contact. More particularly, different deflections may be correlated with different forces at a same location of contact, and different correlations between deflection and force may be provided for different locations of contact.

Controller 111 may be configured to provide a first response to contact on a surface of display 103 of touch sensitive user interface 101 when a force/deflection detected by force/deflection detector 107 is less than a threshold, and to provide a second response to the contact on the surface of display 103 of touch sensitive user interface 101 when the detected force/deflection is greater that the threshold, with the first and second responses being different. Accordingly, controller 111 may be configured to select one of a plurality of different operations responsive to detecting a location of contact on touch sensitive user interface 101 and responsive to detecting a force/deflection at the location, and then to perform the selected operation. As discussed in greater detail below, by detecting a location and a force/deflection of contact, different operations may be performed by controller 111 for the same location of contact depending on the force/deflection applied at that location of contact.

By way of example, contact detector 105 may be configured to detect a location of contact at a virtual button (e.g., an icon) provided on display 103 of touch sensitive user interface 101. Controller 111 may be configured to provide a first response of selecting the virtual button (e.g., changing an appearance, size, color, brightness, etc. of the virtual button) when the detected force/deflection is less than the threshold, and controller 111 may be configured to provide a second response of executing a function associated with the virtual button (e.g., running an application or program associated with the virtual button) when the detected force/deflection is greater than the threshold. According to other embodiments of the present invention, contact detector 105 may be configured to detect a location of contact at a virtual button (e.g., a scroll button) provided on display 103 of touch sensitive user interface 101. Controller 111 may be configured to provide a first response of executing a function associated with the virtual button at a first rate when the detected force/deflection is less than the threshold, and controller 111 may be configured to provide a second response by executing the function associated with the virtual button at a second rate different than the first rate. If the virtual button is a scroll button, for example, relatively low force contact on a portion of display 103 illustrating the scroll button (resulting in relatively small deflection) may provide relatively slow scrolling on display 103, and relatively high force contact on the portion of display 103 illustrating the scroll button (resulting in relatively great deflection) may provide relatively fast scrolling on display 103.

Moreover, an electromagnetic radiation source of force/deflection detector 107 may be configured to modulate the electromagnetic radiation (e.g., responsive to a modulated control signal from controller 111), and an electromagnetic radiation detector of force/deflection detector 107 may be configured to selectively detect the modulated electromagnetic radiation. Controller 111, for example, may be configured to filter out signals from the detector corresponding to non-modulated radiation so that signals corresponding to the modulated radiation are selectively used to detect deflection/force. Accordingly, interference with operation of force/deflection detector 107 resulting from ambient light may be reduced. Stated in other words, by modulating the electromagnetic radiation used by force/deflection detector 107 so that the modulated electromagnetic radiation used by force/deflection detector 107 can be distinguished from ambient electromagnetic radiation (e.g., from sunlight, indoor lighting, etc.), interference with force/deflection detector can be reduced thereby increasing performance.

In addition, an electromagnetic radiation source of force/deflection detector 107 may be configured to transmit non-visible electromagnetic radiation (e.g., infrared (IR) electromagnetic radiation). Accordingly, interference with visible information provided on display 103 may be reduced. In other words, by operating force/deflection detector 107 using non-visible electromagnetic radiation, a quality of visible information provided on display 103 should not be significantly impacted.

Moreover, power consumption from force/deflection detector 107 may be reduced by providing that the electromagnetic radiation source of force/deflection detector 107 is not on continuously. For example, the electromagnetic radiation source of force/deflection detector 107 may be configured to transmit the electromagnetic radiation only after contact detector 105 has first detected contact, and to terminate transmission once contact detector 105 no longer detects contact. Stated in other words, force/deflection detector 107 may only transmit radiation while contact detector 105 detects contact. In addition or in an alternative, the electromagnetic radiation source of force/deflection detector 107 may be configured to transmit the electromagnetic radiation in pulses according to a duty cycle defining a length of each pulse and an off-period between consecutive pulses. By reducing an amount of time that force/deflection detector 107 is transmitting and detecting the electromagnetic radiation, power consumption may be reduced. Accordingly, battery life may be increased in a battery operated device.

Figure 2:
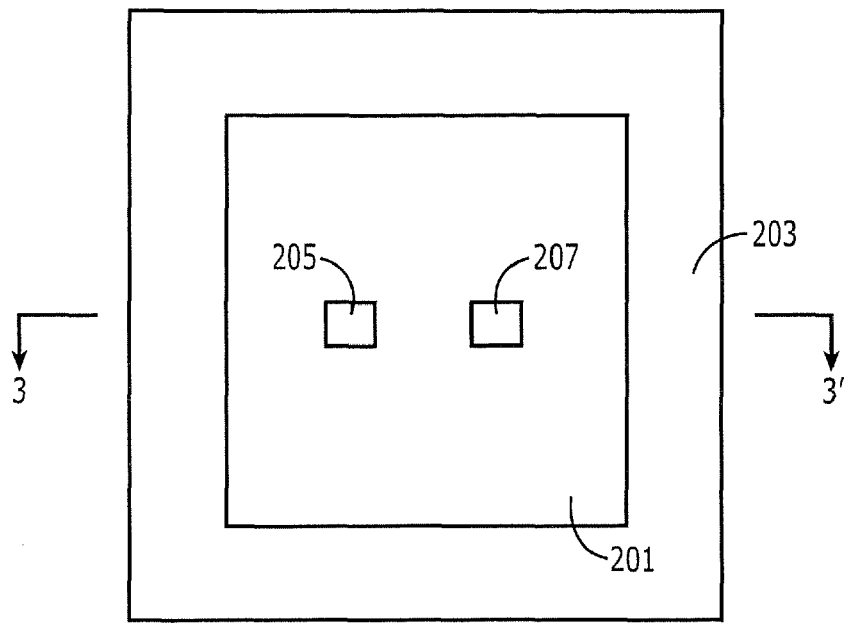
FIG. 2 is a plan view illustrating touch sensitive user interfaces accordingly to some embodiments of the present invention.
Figure 3A:
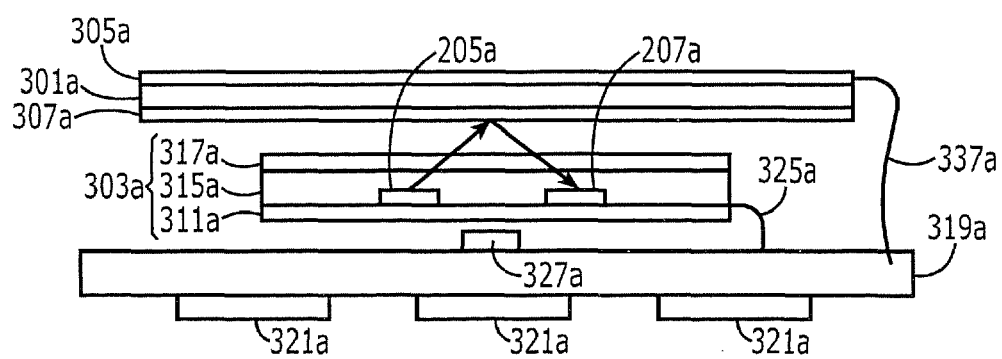
FIGS. 3A-3D are cross sectional views illustrating alternative touch sensitive user interface structures taken along section line 3-3' of FIG. 2 according to embodiments of the present invention.
Figure 3B:
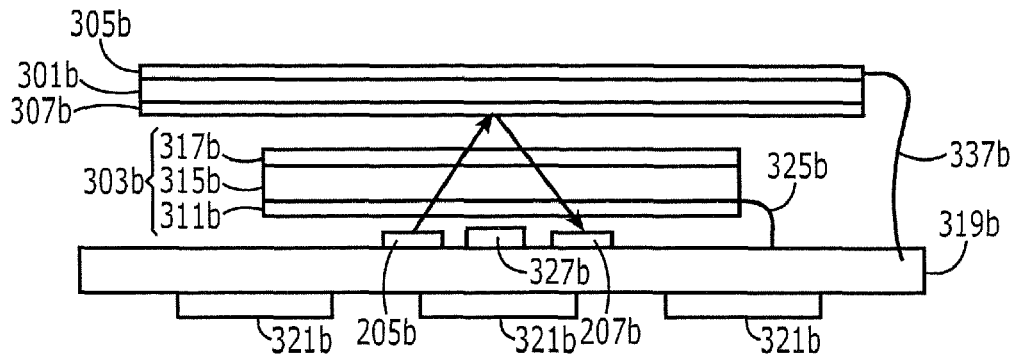
Figure 3C:
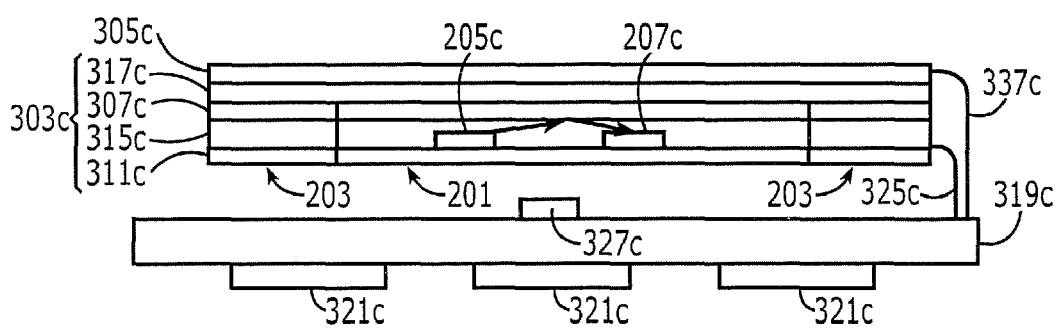
Figure 3D:
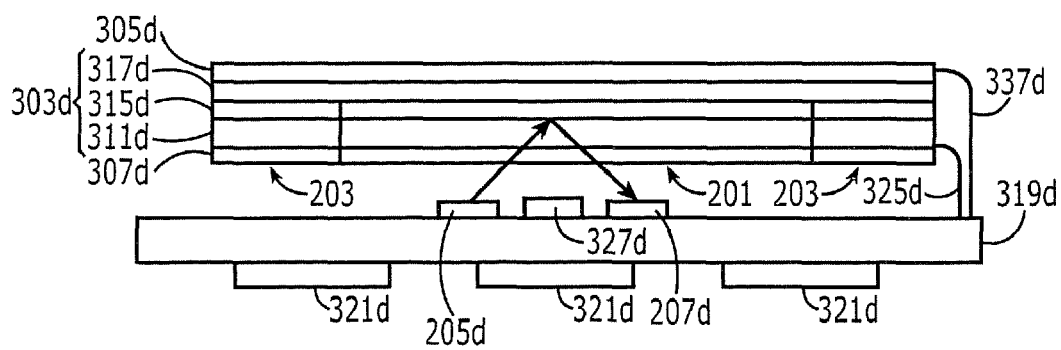
Figure 4:
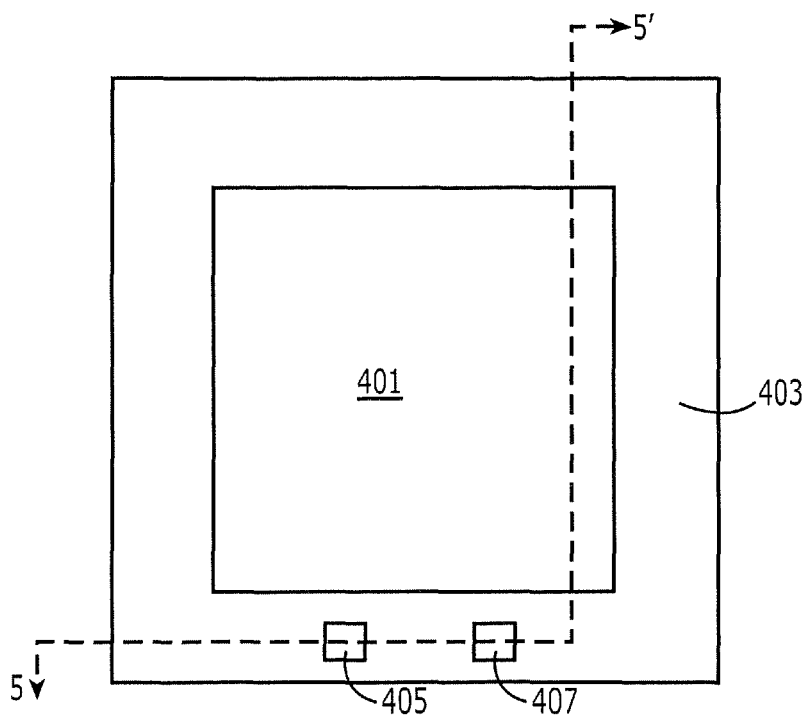
FIG. 4 is a plan view illustrating touch sensitive user interfaces accordingly to some embodiments of the present invention.
Figure 5A:
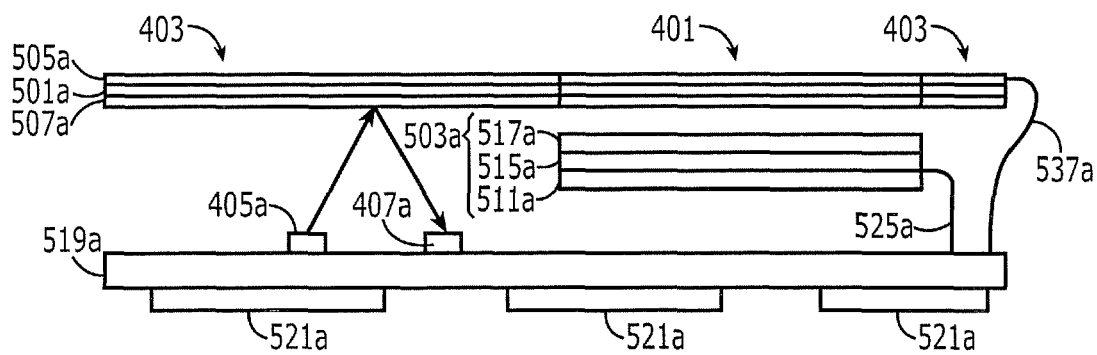
FIGS. 5A-5B are cross sectional views illustrating alternative touch sensitive user interface structures taken along section line 5-5' of FIG. 4 according to embodiments of the present invention.
Figure 5B:
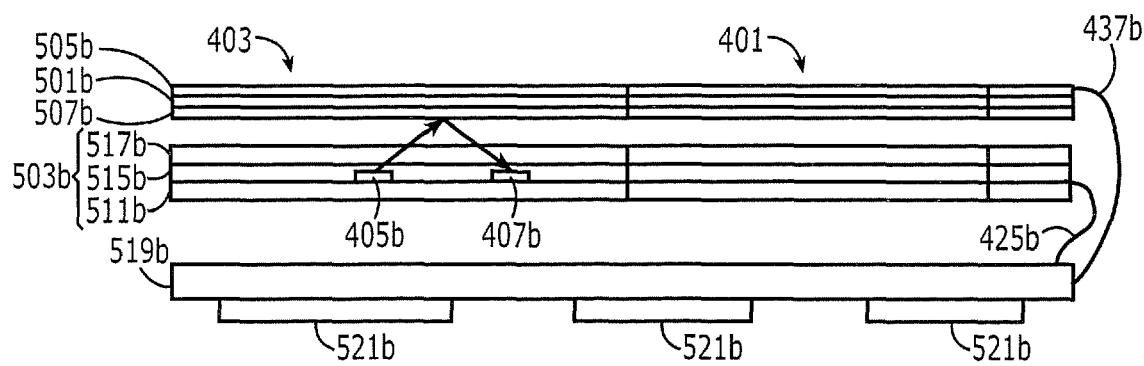

FIGS. 2 and 4 are plan views illustrating displays accordingly to some embodiments of the present invention. FIGS. 3A-3D are cross sectional views illustrating alternative display structures taken along section line 3-3' of FIG. 2 according to embodiments of the present invention. FIGS. 5A-5B are cross sectional views illustrating alternative display structures taken along section line 5-5' of FIG. 4 according to embodiments of the present invention.

As shown in FIG. 2, display 103 of FIG. 1 may include an active display area 201 and an inactive display area 203 surrounding the active display area 201. Force/deflection detector 107 may include electromagnetic radiation source 205 (e.g., an IR LED and/or an IR laser diode) and electromagnetic detector 207 (e.g., a photodiode and/or a phototransistor) mounted behind the active display area 201. As discussed in greater detail below with respect to FIGS. 3A-3D, display 103 may be a liquid crystal display including first and second transparent LCD substrates with a liquid crystal material therebetween. In addition, one of the LCD substrates may include a matrix of conductors in a grid used to control individual pixels in the active display area 201. With a passive matrix display, a grid of conductors may be provided without active elements (i.e., without transistors), while with an active matrix display, a grid of conductors may be provided with an active element (e.g., a thin film transistor) for each pixel of the active display area. Electromagnetic radiation source 205 and electromagnetic detector 207 may thus be used to detect force applied to a surface of display 101 (and/or the resulting deflection) using reflected electromagnetic radiation to measure resulting deflections of a surface of display 101.

As shown in FIG. 3A, protective layer 301a may be provided between liquid crystal display 303a and an outside of the electronic device, and contact sensitive element(s)/layer(s) 305a may be provided on protective layer 301a to detect a two dimensional location of contact on protective layer 301a. In addition, reflective layer 307a may be configured to selectively reflect electromagnetic radiation (e.g., non-visible electromagnetic radiation) transmitted by electromagnetic radiation source 205a (e.g., light emitting diode, laser diode, etc.) while transmitting visible light generated by liquid crystal display 303a. In addition, backlight 327a may be provided to illuminate liquid crystal display 303a with visible light.

While reflective layer 307a is shown on an inside surface of protective layer 301a, reflective layer 307a may be provided on an outside surface of protective layer 301a. Moreover, reflective layer 307a may be omitted, for example, if protective layer 301a provides appropriate reflective properties.

Liquid crystal display 303a may include transparent substrates 311a and 317a and a liquid crystal material 315a therebetween. Moreover, liquid crystal display 303a may include a matrix (active or passive) of conductors in a grid used to control individual pixels in the active display area 201 on a surface of transparent substrate 311a adjacent liquid crystal material 315a. Moreover, electromagnetic radiation source 205a and electromagnetic radiation detector 207a may be provided on the surface of transparent substrate 311a adjacent liquid crystal material 315a. Accordingly, the matrix of conductors (used to control display pixels), electromagnetic radiation source 205a, and electromagnetic radiation detector 207a may be fabricated together on a same surface of transparent substrate 311a during assembly of liquid crystal display 303a.

According to some embodiments of the present invention, radiation source 205a and/or radiation detector 207a may be provided on an active display area of substrate 311a so that one or more pixels of the display may be sacrificed to provide radiation source 205a and/or radiation detector 207a. Stated in other words, radiation source 205a and/or radiation detector 207a may be surrounded by pixels of the display. According to other embodiments of the present invention, radiation source 205a and/or radiation detector 207a may be provided on an inactive display area of substrate 311a (i.e., outside the active display area) so that a sacrifice of pixels is not required.

In addition, an electronic assembly, such as a printed circuit board 319a with electronic devices 321a (e.g., integrated circuit devices, discrete electronic devices, etc.) thereon, may provide functionality of controller 111, transceiver 115, and/or memory 117. Other components, such as keyboard/keypad 119, speaker 121, microphone 123, etc., may be provided on and/or electrically coupled to printed circuit board 319a. In addition, electrical couplings 325a and 337a may provide electrical coupling between printed circuit board 319a and transparent substrate 311a, and between printed circuit board 319a and contact sensitive element(s)/layer(s) 305a. Accordingly, contact sensitive element(s)/layer(s) 305a together with controller 111 may provide a contact detector configured to detect a two dimensional location of contact on touch sensitive user interface 101. In addition, electromagnetic radiation source 205a and electromagnetic radiation detector 207a together with controller 111 may provide a force/deflection detector configured to detect a force/deflection at the surface of the touch sensitive user interface 101.

Electromagnetic radiation source 205a (e.g., light emitting diode, laser diode, etc.) may be configured to generate modulated non-visible electromagnetic radiation (e.g., IR radiation) responsive to control signals received from controller 111. The non-visible electromagnetic radiation may be reflected off reflective layer 307a to electromagnetic radiation detector 207a (e.g., photodiode, phototransistor, etc.). Based on signals received from electromagnetic radiation detector 207a, controller 111 may be configured to determine position/deflection/movement of reflective layer 307a, and based on the determined position/deflection/movement, controller 111 may be configured to determine a force/deflection applied to the protective layer 301a. The structure of FIG. 3A may thus be configured detect force/deflection based on position/deflection/movement of protective layer 301a relative to substrate 311a of liquid crystal display 303a.

As shown in FIG. 3B, protective layer 301b may be provided between liquid crystal display 303b and an outside of the electronic device, and contact sensitive element(s)/layer(s) 305b may be provided on protective layer 301b to detect a two dimensional location of contact on protective layer 301b. In addition, reflective layer 307b may be configured to selectively reflect electromagnetic radiation (e.g., non-visible electromagnetic radiation) transmitted by electromagnetic radiation source 309b (e.g., light emitting diode, laser diode, etc.) while transmitting visible light generated by liquid crystal display 303b. In addition, backlight 327b may be provided to illuminate liquid crystal display 303b with visible light.

While reflective layer 307b is shown on an inside surface of protective layer 301b, reflective layer 307b may be provided on an outside surface of protective layer 301b. Moreover, reflective layer 307b may be omitted, for example, if protective layer 301b provides appropriate reflective properties.

Liquid crystal display 303b may include transparent substrates 311b and 317b and a liquid crystal material 315b therebetween. Moreover, liquid crystal display 303b may include a matrix (active or passive) of conductors in a grid used to control individual pixels in the active display area 201 on a surface of transparent substrate 311b adjacent liquid crystal material 315b. In FIG. 3B, electromagnetic radiation source 205b and electromagnetic radiation detector 207b may be provided on printed circuit board 319b, and radiation from radiation source 205b may be transmitted through both substrates 311b and 317b and liquid crystal material 315b before reflecting off layer 307b.

In addition, an electronic assembly, such as printed circuit board 319b with electronic devices 321b (e.g., integrated circuit devices, discrete electronic devices, etc.) thereon, may provide functionality of controller 111, transceiver 115, and/or memory 117. Other components, such as keyboard/keypad 119, speaker 121, microphone 123, etc., may be provided on and/or electrically coupled to printed circuit board 319b. In addition, electrical couplings 325b and 337b may provide electrical coupling between printed circuit board 319b and transparent substrate 311b, and between printed circuit board 319b and contact sensitive element(s)/layer(s) 305b. Accordingly, contact sensitive element(s)/layer(s) 305b together with controller 111 may provide a contact detector configured to detect a two dimensional location of contact on touch sensitive user interface 101. In addition, electromagnetic radiation source 205b and electromagnetic radiation detector 207b together with controller 111 may provide a force/deflection detector configured to detect a force/deflection at the surface of the touch sensitive user interface.

Electromagnetic radiation source 205b (e.g., light emitting diode, laser diode, etc.) may be configured to generate modulated non-visible electromagnetic radiation (e.g., IR radiation) responsive to control signals received from controller 111. The non-visible electromagnetic radiation may be reflected off reflective layer 307b to electromagnetic radiation detector 207b (e.g., photodiode, phototransistor, etc.). Based on signals received from electromagnetic radiation detector 207b, controller 111 may be configured to determine position/deflection/movement of reflective layer 307b, and based on the determined position/deflection/movement, controller 111 may be configured to determine a force/deflection applied to the protective layer 301b. The structure of FIG. 3B may thus be configured detect force/deflection based on position/deflection/movement of protective layer 301b relative to printed circuit board 319b.

As shown in FIG. 3C, a spaced apart protective layer may be omitted, and contact sensitive element(s)/layer(s) 305c may be provided directly on liquid crystal display 303c to detect a two dimensional location of contact thereon. Liquid crystal display 303c may include transparent substrates 311c and 317c and a liquid crystal material 315c therebetween. In addition, liquid crystal display 303c may include a matrix (active or passive) of conductors in a grid used to control individual pixels in the active display area 201 on a surface of transparent substrate 311c adjacent liquid crystal material 315c. Reflective layer 307c may be configured to selectively reflect electromagnetic radiation (e.g., non-visible electromagnetic radiation) transmitted by electromagnetic radiation source 309c (e.g., light emitting diode, laser diode, etc.) while transmitting visible light generated by liquid crystal display 303c. Moreover, electromagnetic radiation source 205c and electromagnetic radiation detector 207c may be provided on the surface of transparent substrate 311c adjacent liquid crystal material 315c. Accordingly, the matrix of conductors (used to control display pixels), electromagnetic radiation source 205c, and electromagnetic radiation detector 207c may be fabricated together on a same surface of transparent substrate 311c during assembly of liquid crystal display 303c. In addition, backlight 327c may be provided to illuminate liquid crystal display 303c with visible light.

While reflective layer 307c is shown on an inside surface of transparent substrate 317c, reflective layer 307c may be provided on an outside surface of substrate 317c. Moreover, reflective layer 307c may be omitted, for example, if substrate 317c provides appropriate reflective properties.

In addition, an electronic assembly, such as a printed circuit board 319c with electronic devices 321c (e.g., integrated circuit devices, discrete electronic devices, etc.) thereon, may provide functionality of controller 111, transceiver 115, and/or memory 117. Other components, such as keyboard/keypad 119, speaker 121, microphone 123, etc., may be provided on and/or electrically coupled to printed circuit board 319c. In addition, electrical couplings 325c and 337c may provide electrical coupling between printed circuit board 319c and transparent substrate 311c, and between printed circuit board 319c and contact sensitive element(s)/layer(s) 305c. Accordingly, contact sensitive element(s)/layer(s) 305c together with controller 111 may provide a contact detector configured to detect a two dimensional location of contact on touch sensitive user interface 101. In addition, electromagnetic radiation source 205c and electromagnetic radiation detector 207c together with controller 111 may provide a force/deflection detector configured to detect a force/deflection at the surface of the touch sensitive user interface 101.

Electromagnetic radiation source 205c (e.g., light emitting diode, laser diode, etc.) may be configured to generate modulated non-visible electromagnetic radiation (e.g., IR radiation) responsive to control signals received from controller 111. The non-visible electromagnetic radiation may be reflected off reflective layer 307c to electromagnetic radiation detector 207c (e.g., photodiode, phototransistor, etc.). Based on signals received from electromagnetic radiation detector 207c, controller 111 may be configured to determine position/deflection/movement of reflective layer 307c, and based on the determined position/deflection/movement, controller 111 may be configured to determine a force/deflection applied to the protective layer 301c. The structure of FIG. 3C may thus be configured detect force/deflection based on position/deflection/movement of substrate 317c relative to substrate 311c of liquid crystal display 303c. According to other embodiments of the present invention, radiation source and detector 205c and 207c may be provided on printed circuit board 319c so that radiation from source 205c is transmitted through substrate 311c before reflecting back to detector 207c.

Locations of radiation source and detector 205c and 207c are shown in an active display area 201 of substrate 311c by way of example. Source and detector 205c and 207c may be provided at other locations, however, such as in an inactive area 203 of substrate 311c. According to still other embodiments, source and detector 205c and 207c may be provided on printed circuit board 319c with reflection being provided off reflective layer 307c.

According to some embodiments of the present invention, radiation source 205c and/or radiation detector 207c may be provided on an active display area of substrate 311c so that one or more pixels of the display may be sacrificed to provide radiation source 205c and/or radiation detector 207c. Stated in other words, radiation source 205c and/or radiation detector 207c may be surrounded by pixels of the display. According to other embodiments of the present invention, radiation source 205c and/or radiation detector 207c may be provided on an inactive display area of substrate 311c (i.e., outside the active display area) so that a sacrifice of pixels is not required.

As shown in FIG. 3D, a spaced apart protective layer may be omitted, and contact sensitive element(s)/layer(s) 305d may be provided directly on liquid crystal display 303d to detect a two dimensional location of contact thereon. Liquid crystal display 303d may include transparent substrates 311d and 317d and a liquid crystal material 315d therebetween. In addition, liquid crystal display 303d may include a matrix (active or passive) of conductors in a grid used to control individual pixels in the active display area 201 on a surface of transparent substrate 311d adjacent liquid crystal material 315d. Reflective layer 307d may be configured to reflect electromagnetic radiation (e.g., non-visible electromagnetic radiation) transmitted by electromagnetic radiation source 309d (e.g., light emitting diode, laser diode, etc.) while transmitting visible light generated by liquid crystal display 303d. In addition, backlight 327d may be provided to illuminate liquid crystal display 303d with visible light.

In FIG. 3D, electromagnetic radiation source 205d and electromagnetic radiation detector 207d may be provided on printed circuit board 319d, and radiation from radiation source 205d may be reflected off reflective layer 307d. While reflective layer 307d is shown on an outside surface of transparent substrate 311d, reflective layer 307d may be provided on an inside surface of substrate 311d or on substrate 317d. Moreover, reflective layer 307d may be omitted, for example, if substrate 311d and/or substrate 317d provides appropriate reflective properties.

An electronic assembly, such as printed circuit board 319d with electronic devices 321d (e.g., integrated circuit devices, discrete electronic devices, etc.) thereon, may provide functionality of controller 111, transceiver 115, and/or memory 117. Other components, such as keyboard/keypad 119, speaker 121, microphone 123, etc., may be provided on and/or electrically coupled to printed circuit board 319d. In addition, electrical couplings 325d and 337d may provide electrical coupling between printed circuit board 319d and transparent substrate 311d, and between printed circuit board 319d and contact sensitive element(s)/layer(s) 305d. Accordingly, contact sensitive element(s)/layer(s) 305d together with controller 111 may provide a contact detector configured to detect a two dimensional location of contact on touch sensitive user interface 101. In addition, electromagnetic radiation source 205d and electromagnetic radiation detector 207d together with controller 111 may provide a force/deflection detector configured to detect a force/deflection at the surface of the touch sensitive user interface 101.

Electromagnetic radiation source 205d (e.g., light emitting diode, laser diode, etc.) may be configured to generate modulated non-visible electromagnetic radiation (e.g., IR radiation) responsive to control signals received from controller 111. The non-visible electromagnetic radiation may be reflected off reflective layer 307d to electromagnetic radiation detector 207d (e.g., photodiode, phototransistor, etc.). Based on signals received from electromagnetic radiation detector 207d, controller 111 may be configured to determine position/deflection/movement of reflective layer 307d, and based on the determined position/deflection/movement, controller 111 may be configured to determine a force/deflection applied to display 103. The structure of FIG. 3D may thus be configured detect force/deflection based on position/deflection/movement of substrate 311d and/or substrate 317d relative to printed circuit board 319d.

Locations of radiation source and detector 205d and 207d are shown in an active display area 201 by way of example. Source and detector 205d and 207d may be provided at other locations on printed circuit board 319d, however, such as in an inactive area 203.

As shown in FIG. 4, display 103 of FIG. 1 may include an active display area 401 and an inactive display area 403 surrounding the active display area 401. Force/deflection detector 107 may include electromagnetic radiation source 405 (e.g., an IR LED and/or an IR laser diode) and electromagnetic detector 407 (e.g., a photodiode and/or a phototransistor) mounted behind inactive display area 403. As discussed in greater detail below with respect to FIGS. 5A-5B, display 103 may be a liquid crystal display including first and second transparent LCD substrates with a liquid crystal material therebetween. In addition, one of the LCD substrates may include a matrix of conductors in a grid used to control individual pixels in the active display area 401. With a passive matrix display, a grid of conductors may be provided without active elements (i.e., without transistors), while with an active matrix display, a grid of conductors may be provided with an active element (e.g., a thin film transistor) for each pixel of the active display area. Electromagnetic radiation source 405 and electromagnetic detector 407 may thus be used to detect force/deflection applied to a surface of display 101 by using reflected electromagnetic radiation to measure resulting deflections of the surface of display 101.

As shown in FIG. 5A, protective layer 501a may be provided between liquid crystal display 503a and an outside of the electronic device, and contact sensitive element(s)/layer(s) 505a may be provided on protective layer 501a to detect a two dimensional location of contact on protective layer 501a. In addition, reflective layer 507a may be configured to reflect electromagnetic radiation (e.g., non-visible electromagnetic radiation) transmitted by electromagnetic radiation source 509a (e.g., light emitting diode, laser diode, etc.) while transmitting visible light generated by liquid crystal display 503a. In addition, a backlight may be provided on printed circuit board 519a to illuminate liquid crystal display 503a with visible light.

While reflective layer 507a is shown on an inside surface of protective layer 501a, reflective layer 507a may be provided on an outside surface of protective layer 501a. Moreover, reflective layer 507a may be omitted, for example, if protective layer 501a provides appropriate reflective properties.

Liquid crystal display 503a may include transparent substrates 511a and 517a and a liquid crystal material 515a therebetween. Moreover, liquid crystal display 503a may include a matrix (active or passive) of conductors in a grid used to control individual pixels in the active display area 401 on a surface of transparent substrate 511a adjacent liquid crystal material 515a. In FIG. 5A, electromagnetic radiation source 405a and electromagnetic radiation detector 407a may be provided on printed circuit board 519a, and radiation from radiation source 405a may be reflected off layer 507a to detector 407a.

In addition, an electronic assembly, such as printed circuit board 519a with electronic devices 521a (e.g., integrated circuit devices, discrete electronic devices, etc.) thereon, may provide functionality of controller 111, transceiver 115, and/or memory 117. Other components, such as keyboard/keypad 119, speaker 121, microphone 123, etc. may be provided on and/or electrically coupled to printed circuit board 519a. In addition, electrical couplings 525a and 537a may provide electrical coupling between printed circuit board 519a and transparent substrate 511a, and between printed circuit board 519a and contact sensitive element(s)/layer(s) 505a. Accordingly, contact sensitive element(s)/layer(s) 505a together with controller 111 may provide a contact detector configured to detect a two dimensional location of contact on touch sensitive user interface 101. In addition, electromagnetic radiation source 405a and electromagnetic radiation detector 407a together with controller 111 may provide a force/deflection detector configured to detect a force/deflection of contact on the surface of the touch sensitive user interface.

Electromagnetic radiation source 405a (e.g., light emitting diode, laser diode, etc.) may be configured to generate modulated non-visible electromagnetic radiation (e.g., IR radiation) responsive to control signals received from controller 111. The non-visible electromagnetic radiation may be reflected off reflective layer 507a to electromagnetic radiation detector 407a (e.g., photodiode, phototransistor, etc.). Based on signals received from electromagnetic radiation detector 407a, controller 111 may be configured to determine position/deflection/movement of reflective layer 507a, and based on the determined position/deflection/movement, controller 111 may be configured to determine a force/deflection applied to the protective layer 501a. The structure of FIG. 5A may thus be configured detect force/deflection based on position/deflection/movement of protective layer 501a relative to printed circuit board 519a.

As shown in FIG. 5B, protective layer 501b may be provided between liquid crystal display 503b and an outside of the electronic device, and contact sensitive element(s)/layer(s) 505b may be provided on protective layer 501b to detect a two dimensional location of contact on protective layer 501b. In addition, reflective layer 507b may be configured to reflect electromagnetic radiation (e.g., non-visible electromagnetic radiation) transmitted by electromagnetic radiation source 509b (e.g., light emitting diode, laser diode, etc.) while transmitting visible light generated by liquid crystal display 503b. In addition, a backlight may be provided on printed circuit board 519b to illuminate liquid crystal display 503b with visible light.

While reflective layer 507b is shown on an inside surface of protective layer 301a, reflective layer 507b may be provided on an outside surface of protective layer 501b. Moreover, reflective layer 507b may be omitted, for example, if protective layer 501b provides appropriate reflective properties.

Liquid crystal display 503b may include transparent substrates 511b and 517b and a liquid crystal material 515b therebetween. Moreover, liquid crystal display 503b may include a matrix (active or passive) of conductors in a grid used to control individual pixels in the active display area 401 on a surface of transparent substrate 511b adjacent liquid crystal material 515b. Moreover, electromagnetic radiation source 405b and electromagnetic radiation detector 407b may be provided on the surface of transparent substrate 511b adjacent liquid crystal material 515b in inactive display area 403. Accordingly, the matrix of conductors (used to control display pixels), electromagnetic radiation source 405b, and electromagnetic radiation detector 407b may be fabricated together on a same surface of transparent substrate 511b during assembly of liquid crystal display 503b.

In addition, an electronic assembly, such as a printed circuit board 519b with electronic devices 521b (e.g., integrated circuit devices, discrete electronic devices, etc.) thereon, may provide functionality of controller 111, transceiver 115, and/or memory 117. Other components, such as keyboard/keypad 119, speaker 121, microphone 123, etc., may be provided on and/or electrically coupled to printed circuit board 519b. In addition, electrical couplings 525b and 537b may provide electrical coupling between printed circuit board 519b and transparent substrate 511b, and between printed circuit board 519b and contact sensitive element(s)/layer(s) 505b. Accordingly, contact sensitive element(s)/layer(s) 505b together with controller 111 may provide a contact detector configured to detect a two dimensional location of contact on touch sensitive user interface 101. In addition, electromagnetic radiation source 405b and electromagnetic radiation detector 407b together with controller 111 may provide a force/deflection detector configured to detect a force/deflection of contact on the surface of the touch sensitive user interface 101.

Electromagnetic radiation source 405b (e.g., light emitting diode, laser diode, etc.) may be configured to generate modulated non-visible electromagnetic radiation (e.g., IR radiation) responsive to control signals received from controller 111. The non-visible electromagnetic radiation may be reflected off reflective layer 507b to electromagnetic radiation detector 407b (e.g., photodiode, phototransistor, etc.). Based on signals received from electromagnetic radiation detector 407b, controller 111 may be configured to determine position/deflection/movement of reflective layer 507b, and based on the determined position/deflection/movement, controller 111 may be configured to determine a force/deflection applied to the protective layer 501b. The structure of FIG. 5B may thus be configured detect force/deflection based on position/deflection/movement of protective layer 501b relative to substrate 511b of liquid crystal display 503b in inactive display area 403.

As discussed above, a force/deflection applied to touch sensitive user interface 101 may be detected using changes in reflected electromagnetic radiation to determine a deflection resulting from the applied force. Because a same force applied to different portions of the user interface may result in different deflections at a region from which radiation is reflected, controller 111 may be configured to correlate reflections differently depending on a two dimensional location of contact on display (determined using contact detector). A force applied at a center portion of touch sensitive user interface 101, for example, may result in a greater detected deflection than a same force applied to a perimeter portion of touch sensitive user interface 101 if radiation source and detector are configured to reflect the measured radiation at a center portion of touch sensitive user interface 101. For example, a lookup table may be used to provide different correlations of reflections with respect to force/deflection for different x-y coordinates of the touch sensitive user interface. By first detecting a location (e.g., x-y coordinates) of contact (e.g., using contact detector 105 and controller 111), controller 111 may correlate reflections (generated and detected using force/deflection detector 119) with the particular location of contact using such a lookup table to more accurately determine a force/deflection at the location of contact.

In addition or in an alternative, a plurality of radiation source/detector pairs may be provided across touch sensitive user interface 101 to improve an accuracy of force/deflection detection. Moreover, a plurality of radiation detectors may be configured to receive multiple reflections from a single radiation source to improve force/deflection detection, and/or a single radiation detector may be configured to receive reflections from a plurality of radiation sources.

Figure 6:
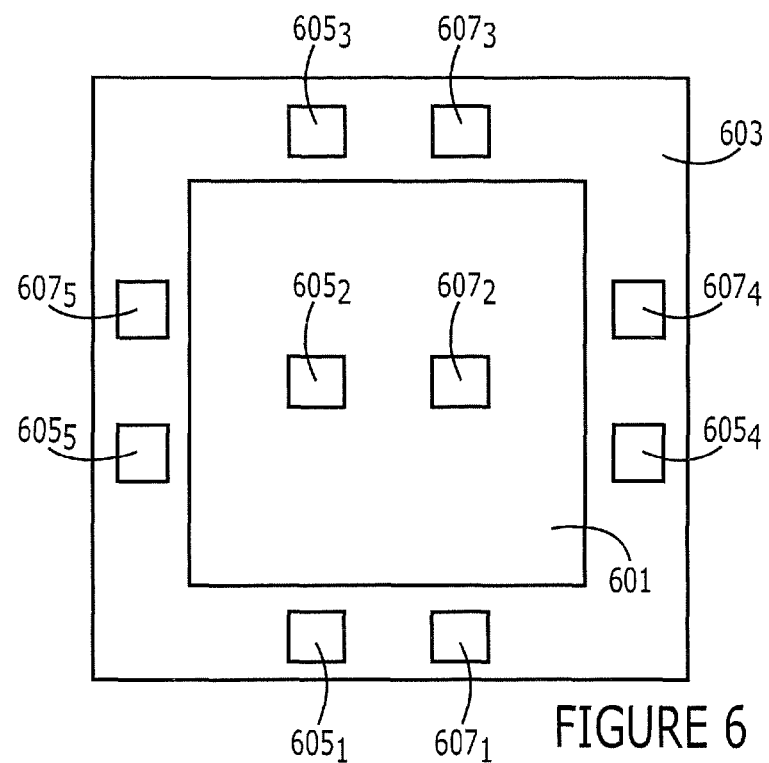
FIG. 6 is a plan view illustrating touch sensitive user interfaces including a plurality of electromagnetic radiation source/detector pairs according to embodiments of the present invention.

As shown in FIG. 6, for example, a plurality of pairs of electromagnetic radiation sources (605$_1$, 605$_2$, 605$_3$, 605$_4$, and 605$_5$) and electromagnetic radiation detectors (607$_1$, 607$_2$, 607$_3$, 607$_4$, and 607$_5$) may be provided to detect deflections as different locations of touch sensitive user interface 101. Interior source and detector pair (605$_2$ and 607$_2$), for example, may be provided as discussed above with respect to FIGS. 3A-3D, and perimeter source and detector pairs (605$_1$ and 607$_1$, 605$_3$ and 607$_3$, 605$_4$ and 607$_4$, and 605$_5$ and 607$_5$) may be provided as discussed above with respect to FIGS. 5A-5B. While perimeter source and detector pairs are shown in an inactive display area 603, perimeter source and detector pairs may be provided in active display area 601. Accordingly, to some embodiments of the present invention, one of the source/detector pairs may be selected to determine deflection/force based on proximity to the location of contact. According to other embodiments of the present invention, a plurality of source/detector pairs may be used to determine a deflection/force.

Figure 7A:
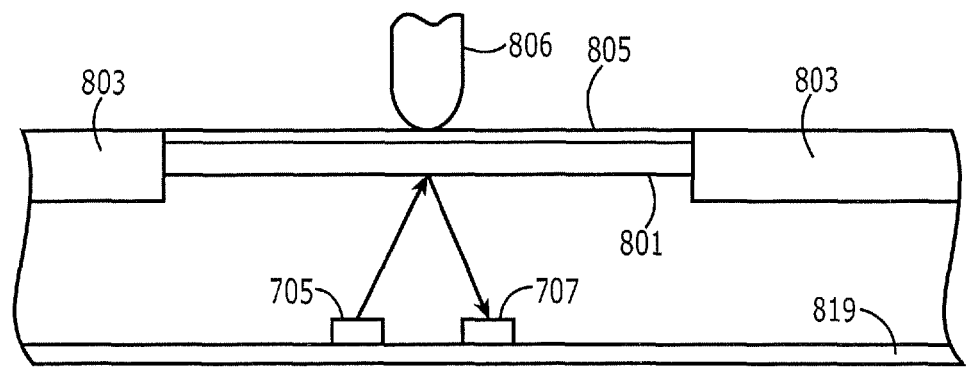
FIGS. 7A and 7B are cross sectional views illustrating principles of operation of force/deflection detectors according to embodiments of the present invention.
Figure 7B:
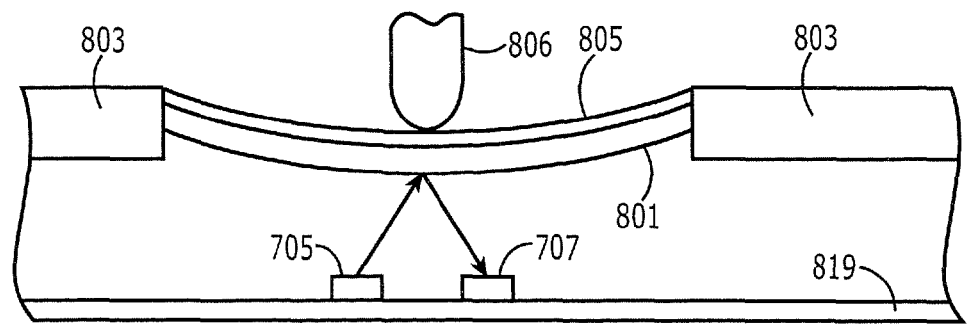

FIGS. 7A and 7B are cross sectional views illustrating principles of operation of force/deflection detectors according to embodiments of the present invention. In particular, a layer 801 (such as protective layer 301*a* of FIG. 3A, protective layer 301*b* of FIG. 3B, substrate 317*c* of FIG. 3C, substrate 311*d* of FIG. 3*d*, protective layer 501*a* of FIG. 5*a*, or protective layer 501*b* of FIG. 5B) of touch sensitive user interface 101 may be mounted on/to a relatively rigid structure 803 (such as a housing of the device). Moreover, electromagnetic radiation source 705 (such as electromagnetic radiation source 205*a*, 205*b*, 205*c*, 205*d*, 405*a*, and/or 405*b* of FIGS. 3A-3D and 5A-5B) and electromagnetic radiation detector 707 (such as electromagnetic radiation detector 207*a*, 207*b*, 207*c*, 207*d*, 407*a*, and/or 407*b* of FIGS. 3A-3D and 5A-5B) may be mounted on a surface 819 (such as a printed circuit board or a transparent substrate of a liquid crystal display) that is substantially rigid/fixed relative to layer 801. In addition, a contact sensitive element(s)/layer(s) 805 (such as contact sensitive element(s)/layer(s) 305*a*, 305*b*, 305*c*, 305*d*, 505*a*, and/or 505*b* of FIGS. 3A-3D and 5A-5B) may be provided on flexible layer 801 to detect a two dimensional location of contact on flexible layer 801. While not shown in FIGS. 7A and 7B, a separate reflective layer (such as reflective layer 307*a*, 307*b*, 307*c*, 307*d*, 507*a*, and/or 507*b* of FIGS. 3A-3D and 5a-5B) may be provided on flexible layer 801.

Upon relatively low force contact from finger/stylus 806, contact sensitive element(s)/layer(s) 805 (together with controller 111) may detect a two dimensional location of contact on layer 801, and relatively little or no deflection of layer 801 may occur as shown in FIG. 7A. Upon detection of the contact, controller 111 may initiate transmission of electromagnetic radiation from electromagnetic radiation source 705 such that the electromagnetic radiation reflects off layer 801 back toward electromagnetic radiation detector 707. Signals generated by detector 707 responsive to the reflected radiation may be processed by controller 111 together with the two dimensional location of contact to determine a deflection/force of/on layer 801. Based on the two dimensional location of contact and the relatively low force applied to layer 801, controller 111 may provide a first response.

Upon relatively high force contact from finger/stylus 806, contact sensitive element(s)/layer(s) 805 (together with controller 111) may detect a two dimensional location of contact on layer 801, and a more significant deflection of layer 801 may occur as shown in FIG. 7B. Upon detection of the contact, controller 111 may initiate transmission of electromagnetic radiation from electromagnetic radiation source 705 such that the electromagnetic radiation reflects off layer 801 back toward electromagnetic radiation detector 707. Signals generated by detector 707 responsive to the reflected radiation may be processed by controller 111 together with the two dimensional location of contact to determine a deflection/force of/on layer 801. Based on the two dimensional location of contact and the relatively high force applied to layer 801, controller 111 may provide a second response different than the first response.

Deflection of layer 801 may thus be proportional to a force applied by finger/stylus 806, and an intensity of electromagnetic radiation reflected to radiation detector 707 may be proportional to deflection of layer 801. Accordingly, a signal generated by radiation detector 707 may be proportional to the intensity of electromagnetic radiation reflection thereon, which may be proportional to the deflection of layer 801, which may be proportional to the force applied to layer 801. Controller 111 may thus be able to determine a force applied to layer 801 using signals generated by radiation detector 707 which may be correlated with a two dimensional location of contact on layer 801.

Figure 8:
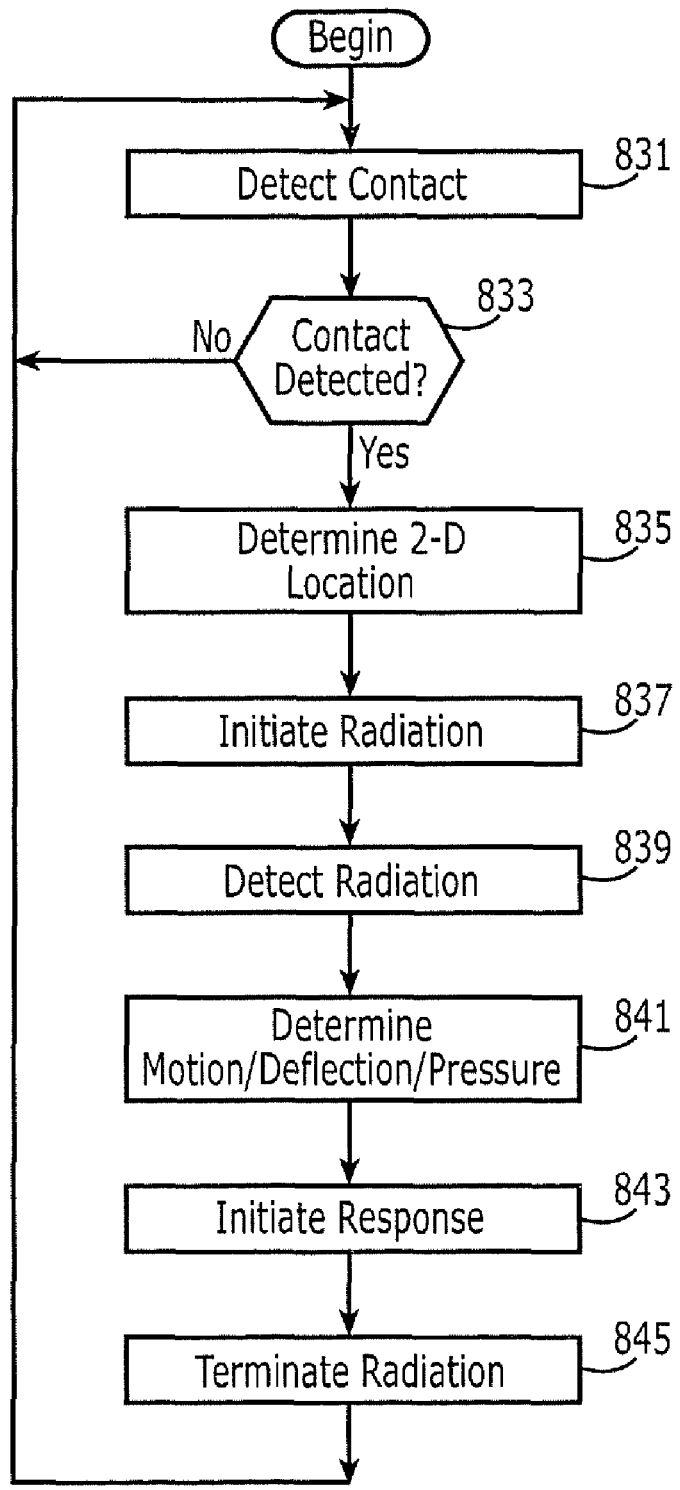
FIG. 8 is a flow chart illustrating operations of a touch sensitive user interface according to some embodiments of the present invention.

FIG. 8 is a flow chart illustrating operations of a touch sensitive user interface according to some embodiments of the present invention. At blocks 831 and 833, controller 111 may maintain radiation source 705 off until contact is detected to reduce power consumption. Upon detecting contact from finger/stylus 806, contact sensitive element(s)/layer(s) 805 (together with controller 111) may determine a two dimensional location of contact on layer 801 at block 835, and controller 111 may initiate transmission of electromagnetic radiation from electromagnetic radiation source 705 at block 837. As discussed above, radiation from electromagnetic radiation source 705 may be pulsed to further reduce power consumption, modulated to reduce interference (e.g., from ambient light/radiation and/or from light/radiation generated by display 103), and/or non-visible (e.g., IR radiation) to reduce interference to display 103.

Reflected radiation may be detected by radiation detector 707 at block 839, and signals generated by detector 707 responsive to the reflected radiation may be processed by controller 111 together with the two dimensional location of contact to determine a deflection/force of/on layer 801 at block 841. Based on the two dimensional location of contact and the relatively low force applied to layer 801, controller 111 may initiate a response at block 843 and terminate radiation from radiation source 705 at block 845.

Electromagnetic radiation sources are discussed above by way of example as including light emitting devices (e.g., diodes and/or laser diodes), and electromagnetic radiation detectors are discussed above by way of example as including photosensors (e.g., photodiodes and/or phototransistors). Radiation sources and/or detectors, however, may include different/additional elements. For example, a radiation source according to some embodiments of the present invention may include an optical fiber to provide increased directionality for electromagnetic radiation transmitted toward layer 801. Similarly, a radiation detector according to some embodiments of the present invention may include an optical fiber to provide increased sensitivity to changes in electromagnetic radiation reflected from layer 801.

While touch sensitive displays are discussed above by way of example, a touch sensitive pad (e.g., a pad used on a laptop/notebook computer to generate computer mouse inputs) may be implemented with contact and force/deflection detectors according to embodiments of the present invention. In the structures of FIGS. 3A, 3B, and 5A, for example, liquid crystal displays 303a, 303b, and 503a may be omitted, and protective layers 301a, 301b, and 501a may be opaque. Because there is no display and because the protective layers 301a, 301b and 501a may be opaque, electromagnetic radiation sources 205a, 205b, and 405a may transmit visible and/or non-visible light, and/or interference from ambient light may be reduced.

As discussed above with respect to FIGS. 3A-3D, 5A-5B, and 7A-7B, the electromagnetic radiation source (e.g., electromagnetic radiation source 205a-d, 405a-b, and/or 705) and the electromagnetic radiation detector (e.g., electromagnetic radiation detector 207a-d, 407a-b, and/or 707) may both be located on a relatively stationary surface (e.g., substrate 311a, printed circuit board 319b, substrate 319c, printed circuit board 319d, printed circuit board 519a, substrate 511b, and/or surface 819) with reflection off of a surface (e.g., layer 301a, layer 307a, layer 301b, layer 307b, layer 307c, substrate 317c, layer 307d, substrate 311d, layer 501a, layer 507a, layer 501b, and/or layer 501b) subjected to force/deflection. According to other embodiments of the present invention, the electromagnetic radiation source (e.g., electromagnetic radiation source 205a-d, 405a-b, and/or 705) and the electromagnetic radiation detector (e.g., electromagnetic radiation detector 207a-d, 407a-b, and/or 707) may both be located on a surface (e.g., layer 301a, layer 307a, layer 301b, layer 307b, layer 307c, substrate 317c, layer 307d, substrate 311d, layer 501a, layer 507a, layer 501b, and/or layer 501b) subjected to force/deflection with reflection off of a relatively stationary surface (e.g., substrate 311a, printed circuit board 319b, substrate 319c, printed circuit board 319d, printed circuit board 519a, substrate 511b, and/or surface 819). According to still other embodiments of the present invention, one of the electromagnetic radiation source (e.g., electromagnetic radiation source 205a-d, 405a-b, and/or 705) or the electromagnetic radiation detector (e.g., electromagnetic radiation detector 207a-d, 407a-b, and/or 707) may be located on a surface (e.g., layer 301a, layer 307a, layer 301b, layer 307b, layer 307c, substrate 317c, layer 307d, substrate 311d, layer 501a, layer 507a, layer 501b, and/or layer 501b) subjected to force/deflection with the other of the electromagnetic radiation source of the electromagnetic radiation detector located on a relatively stationary surface (e.g., substrate 311a, printed circuit board 319b, substrate 319c, printed circuit board 319d, printed circuit board 519a, substrate 511b, and/or surface 819) so that reflection is not required.

Moreover, movement of terminal 100 may result in force (due to acceleration) being applied to the moveable surface (e.g., layer 301a, layer 307a, layer 301b, layer 307b, layer 307c, substrate 317c, layer 307d, substrate 311d, layer 501a, layer 507a, layer 501b, and/or layer 501b) so that the moveable surface deflects relative to the stationary surface (e.g., substrate 311a, printed circuit board 319b, substrate 319c, printed circuit board 319d, printed circuit board 519a, substrate 511b, and/or surface 819). Movement of terminal 100 may thus result in disturbances/interference during force/deflection detection. According to some embodiments of the present invention, terminal 100 may include an accelerometer coupled to controller 111 to detect movement/acceleration of terminal 100. Controller 111 may thus use an output of the accelerometer to filter out movement of terminal 100 when determining a force/deflection applied to touch sensitive user interface 101. Stated in other words, controller 111 may subtract out effects of movement/acceleration of terminal 101 when determining force/deflection applied to touch sensitive user interface.

Computer program code for carrying out operations of devices and/or systems discussed above may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Some embodiments of the present invention have been described above with reference to flowchart and/or block diagram illustrations of methods, mobile terminals, electronic devices, data processing systems, and/or computer program products. These flowchart and/or block diagrams further illustrate exemplary operations of processing user input in accordance with various embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

In the drawings and specification, there have been disclosed examples of embodiments of the invention and, although specific terms are employed, they are used in a generic and descriptive sense only and not for purposes of limitation, the scope of the invention being set forth in the following claims.

That which is claimed is:

1. An electronic device comprising:
   a touch sensitive user interface;
   a contact detector configured to detect a location of contact on a surface of the touch sensitive user interface;
   a force/deflection detector configured to detect a force/deflection on/of the surface of the touch sensitive user interface using electromagnetic radiation; and
   a controller coupled to the touch sensitive user interface wherein the controller is configured to provide a first response to the contact on the surface of the touch sensitive user interface when the detected force/deflection is less than a threshold, and to provide a second response to the contact on the surface of the touch sensitive user interface when the detected force/deflection is greater that the threshold, wherein the first and second responses are different,
   wherein the touch sensitive user interface comprises a liquid crystal display including a liquid crystal material,
   wherein the liquid crystal display is configured to generate a display output using visible light,
   wherein the force/deflection detector is configured to detect the force/deflection on/of the surface of the touch sensitive user interface using non-visible electromagnetic radiation,
   wherein the force/deflection detector includes a selectively reflective layer on the surface of the touch sensitive user interface,
   wherein the selectively reflective layer is reflective with respect to the non-visible electromagnetic radiation and transmissive with respect to the visible light of the liquid crystal display,
   an electromagnetic radiation source configured to transmit the non-visible electromagnetic radiation onto the selectively reflective layer; and
   an electromagnetic radiation detector configured to detect portions of the non-visible electromagnetic radiation reflected from the selectively reflective layer.

2. An electronic device according to claim 1 wherein the force/deflection detector is configured to detect the force/deflection by detecting a deflection of the touch sensitive user interface.

3. An electronic device according to claim 1 wherein the force/deflection detector includes an electromagnetic radiation source configured to transmit the electromagnetic radiation onto a portion of the touch sensitive user interface and an electromagnetic radiation detector configured to detect portions of the electromagnetic radiation reflected from the touch sensitive user interface.

4. An electronic device according to claim 1 wherein the contact detector is configured to detect the location of contact using one of infrared (IR) contact sensing, acoustic wave contact sensing, capacitive contact sensing, and/or resistive contact sensing.

5. An electronic device according to claim 1 wherein the electromagnetic radiation source is configured to only transmit radiation while the contact detector detects contact.

6. An electronic device according to claim 1 wherein the touch sensitive user interface comprises a touch sensitive display, wherein the controller is configured to provide the first response by selecting a virtual button on the touch sensitive display, and wherein the controller is configured to provide the second response by executing a function associated with the virtual button.

7. An electronic device according to claim 1 wherein the touch sensitive user interface comprises a touch sensitive display, wherein the controller is configured to provide the first response by executing a function associated with a virtual button on the touch sensitive display at a first rate, and wherein the controller is configured to provide the second response by executing the function associated with the virtual button at a second rate different than the first rate.

8. An electronic device according to claim 3 wherein the electromagnetic radiation source is configured to modulate the electromagnetic radiation, and wherein the electromagnetic radiation detector is configured to selectively detect the modulated electromagnetic radiation.

9. An electronic device according to claim 3 wherein the electromagnetic radiation source is configured to transmit non-visible electromagnetic radiation.

10. An electronic device according to claim 3 wherein the touch sensitive user interface comprises a liquid crystal display including a transparent substrate and a liquid crystal material adjacent the transparent substrate, and wherein the electromagnetic radiation source is configured to transmit the electromagnetic radiation through the liquid crystal material.

11. An electronic device according to claim 3 wherein the touch sensitive user interface comprises a liquid crystal display including a transparent substrate and a liquid crystal material adjacent the transparent substrate in an active pixel region of the touch sensitive user interface, and wherein the electromagnetic radiation source is configured to transmit the electromagnetic radiation onto a portion of the touch sensitive user interface outside the active pixel region.

12. An electronic device according to claim 3 wherein the touch sensitive user interface comprises a liquid crystal display including a transparent substrate and a liquid crystal material adjacent the transparent substrate in an active pixel region of the touch sensitive user interface, wherein the electromagnetic radiation source comprises a light emitting device on a surface of the transparent substrate adjacent the liquid crystal material, wherein the electromagnetic radiation detector comprises a photosensor on a surface of the transparent substrate adjacent the liquid crystal material.

13. An electronic device according to claim 12 wherein at least one of the light emitting device and/or the photosensor is on an active display area of the transparent substrate.

14. A method of operating an electronic device including a touch sensitive user interface, the method comprising:
   detecting a location of contact on a surface of the touch sensitive user interface;
   detecting a force/deflection on/of the surface of the touch sensitive user interface using electromagnetic radiation;
   when the detected force/deflection is less than a threshold, providing a first response to the contact on the surface of the touch sensitive user interface;
   when the detected force/deflection on/of is greater that the threshold, providing a second response to the contact on the surface of the touch sensitive user interface, wherein the first and second responses are different;
   generating a display output to a liquid crystal display, including a liquid crystal material, using visible light;
   wherein detecting the force/deflection further comprises,
      detecting the force/deflection on/of the surface of the touch sensitive user interface using non-visible electromagnetic radiation,
      reflecting non-visible electromagnetic radiation using a selectively reflective layer on the surface of the touch sensitive user interface,
      transmitting visible light to the liquid crystal display through the selectively reflective layer on the surface of the touch sensitive user interface, transmitting the non-visible electromagnetic radiation from an electromagnetic radiation source onto the selectively reflective layer, and detecting portions of the non-visible electromagnetic radiation reflected from the selectively reflective layer, using an electromagnetic radiation detector.

15. A method according to claim 14 wherein detecting the force/deflection comprises transmitting the electromagnetic radiation onto a portion of the touch sensitive user interface and detecting portions of the electromagnetic radiation reflected from the touch sensitive user interface.

16. A method according to claim 15 wherein the electromagnetic radiation comprises modulated electromagnetic radiation, and wherein detecting comprises selectively detecting the modulated electromagnetic radiation.

17. A method according to claim 15 wherein the touch sensitive user interface comprises a liquid crystal display including a transparent substrate and a liquid crystal material adjacent the transparent substrate in an active pixel region of the touch sensitive user interface, and wherein transmitting the electromagnetic radiation comprises transmitting the electromagnetic radiation onto a portion of the touch sensitive user interface outside the active pixel region.

18. A method according to claim 15 wherein the touch sensitive user interface comprises a liquid crystal display including a transparent substrate and a liquid crystal material adjacent the transparent substrate in an active pixel region of the touch sensitive user interface, wherein transmitting the electromagnetic radiation comprises transmitting the electromagnetic radiation from a light emitting device on a surface of the transparent substrate adjacent the liquid crystal material, and wherein detecting portions of the electromagnetic radiation reflected from the touch sensitive user interface comprises detecting portions of the electromagnetic radiation using a photosensor on a surface of the transparent substrate adjacent the liquid crystal display.

* * * * *

UNITED STATES PATENT AND TRADEMARK OFFICE
CERTIFICATE OF CORRECTION

PATENT NO. : 8,253,712 B2  
APPLICATION NO. : 12/434220  
DATED : August 28, 2012  
INVENTOR(S) : Klinghult It is certified that error appears in the above-identified patent and that said Letters Patent is hereby corrected as shown below:

On the Title Page  
Item (57) Abstract, Line 13: Please correct "greater that the threshold"  
to read -- greater than the threshold --

Item (56) References Cited, Other Publications, Page 2:  
Please correct ""What is LCD?—a definition from Whatis.com,"  
http://searchciomidmarket.techtarget.com/sDef-  
inition/0,,sid183_qci214075,00.html, printed Mar. 31, 2009."

to read -- "What is LCD?—a definition from Whatis.com,"  
http://searchciomidmarket.techtarget.com/sDef-  
inition/0,,sid183_gci214075,00.html, printed Mar. 31, 2009. --

In the Claims  
Column 21, Claim 1, Line 16: Please correct "that the threshold,"  
to read -- than the threshold, --

Column 22, Claim 14, Line 52: Please correct "is greater that the"  
to read -- is greater than the --

Signed and Sealed this  
Nineteenth Day of February, 2013

Teresa Stanek Rea  
*Acting Director of the United States Patent and Trademark Office*